United States Patent
Li et al.

(10) Patent No.: US 11,121,369 B2
(45) Date of Patent: Sep. 14, 2021

(54) POSITIVE ELECTRODE PLATE, METHOD FOR PREPARING THE SAME AND LITHIUM-ION SECONDARY BATTERY

(71) Applicant: Contemporary Amperex Technology Co., Limited, Ningde (CN)

(72) Inventors: Zhiqiang Li, Ningde (CN); Changlong Han, Ningde (CN); Qifeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/051,462

(22) PCT Filed: Aug. 29, 2019

(86) PCT No.: PCT/CN2019/103214
§ 371 (c)(1),
(2) Date: Oct. 29, 2020

(87) PCT Pub. No.: WO2020/043151
PCT Pub. Date: Mar. 5, 2020

(65) Prior Publication Data
US 2021/0159495 A1    May 27, 2021

(30) Foreign Application Priority Data
Aug. 31, 2018   (CN) .......................... 201811011807.X

(51) Int. Cl.
*H01M 4/505*   (2010.01)
*H01M 4/131*   (2010.01)
(Continued)

(52) U.S. Cl.
CPC ......... *H01M 4/505* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

2007/0048597 A1* 3/2007 Ryu ................... H01M 4/364
429/66
2010/0112447 A1    5/2010 Yamamoto et al.
(Continued)

FOREIGN PATENT DOCUMENTS

CN           1947288 A       4/2007
CN         105098139 A      11/2015
(Continued)

OTHER PUBLICATIONS

PCT International Search Report for PCT/CN2019/103214 dated Dec. 4 2019, 11 pages.
(Continued)

*Primary Examiner* — Robert S Carrico
(74) *Attorney, Agent, or Firm* — Law Offices of Liaoteng Wang

(57) ABSTRACT

The present application discloses a positive electrode plate, a preparation method thereof, and a lithium-ion secondary battery, wherein the positive electrode plate includes a positive electrode current collector and a positive electrode film disposed on at least one surface of the positive electrode current collector, wherein the positive electrode film includes a positive active material which is a lithium manganese-based positive active material; and wherein the volume resistivity $\rho_{sum}$ of the positive electrode plate, the powder volume resistivity $\rho$ of the positive active material under a pressure of 20 MPa and the mass percentage a of the positive active material in the positive electrode film satisfy $\rho_{sum}/\rho^{97.5-a} \leq 3$. The positive electrode plate provided in the present application enables the lithium-ion secondary bat-
(Continued)

a b

● First lithium manganese-based positive active material
▲ Second lithium manganese-based positive active material
━ Conductive agent tery to simultaneously have higher safety performance, rate performance and cycle performance.

14 Claims, 1 Drawing Sheet

(51) Int. Cl.
  *H01M 4/525* (2010.01)
  *H01M 4/1391* (2010.01)
  *H01M 4/04* (2006.01)
  *H01M 10/0525* (2010.01)
  *H01M 4/36* (2006.01)
  *H01M 4/02* (2006.01)

(52) U.S. Cl.
  CPC ......... *H01M 4/1391* (2013.01); *H01M 4/364* (2013.01); *H01M 4/525* (2013.01); *H01M 10/0525* (2013.01); *H01M 2004/021* (2013.01); *H01M 2004/028* (2013.01)

(56) References Cited

U.S. PATENT DOCUMENTS

2010/0276217 A1* 11/2010 Sugaya ................. C01G 53/42
                                                      180/65.1

2017/0237064 A1    8/2017  Kitagawa et al.

FOREIGN PATENT DOCUMENTS

| | | |
|---|---|---|
| CN | 105470494 A | 4/2016 |
| CN | 105914404 A | 8/2016 |
| CN | 106025336 A | 10/2016 |
| CN | 107925125 A | 4/2018 |
| CN | 108140829 A | 6/2018 |
| CN | 108232099 A | 6/2018 |
| JP | 2005347134 A | 12/2005 |
| JP | 2008186753 A | 8/2008 |
| JP | 2009117261 A | 5/2009 |
| JP | 2018056054 A | 4/2018 |
| WO | 2018047454 A1 | 3/2018 |

OTHER PUBLICATIONS

The First Office Action and search report dated Jun. 5, 2020 for Chinese Application No. 201811011807.X, 8 pages.
The Decision to grant for Chinese Application No. 202010877771.4, dated May 12, 2021, 6 pages.
The Decision to grant for Chinese Application No. 202010881034.1, dated Apr. 28, 2021, 7 pages.
The Extended European Search Report for European Application No. 19855072.5, dated Jun. 28, 2021, 9 pages.

* cited by examiner

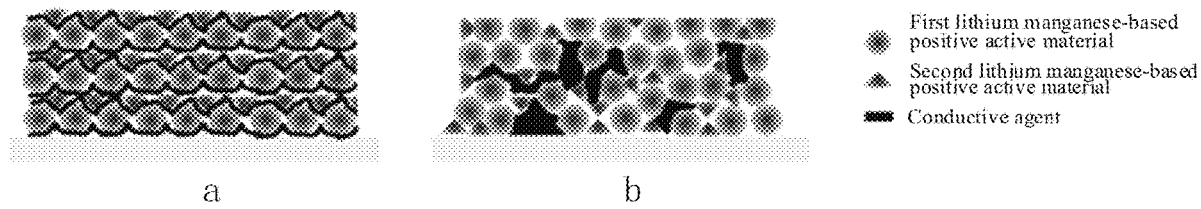

POSITIVE ELECTRODE PLATE, METHOD FOR PREPARING THE SAME AND LITHIUM-ION SECONDARY BATTERY

CROSS-REFERENCE TO RELATED APPLICATION

This application is a National Stage of International Application No. PCT/CN2019/103214, filed on Aug. 29, 2019, which claims priority to Chinese Patent Application No. 201811011807.X filed on Aug. 31, 2018, which is incorporated herein by reference in its entirety.

TECHNICAL FIELD

This application belongs to the technical field of energy storage devices, and specifically relates to a positive electrode plate, a preparation method thereof, and a lithium-ion secondary battery.

BACKGROUND

Lithium-ion secondary batteries can provide stable voltage and current, have a high-voltage platform, high specific energy, and a wide temperature range, and are environmentally friendly and easy to carry. They have become the main power source for various electronic products and electric vehicles. In recent years, with the widespread application of lithium-ion secondary batteries, the market has put forward higher requirements for the electrochemical performance of lithium-ion secondary batteries

SUMMARY

This application provides a positive electrode plate, a preparation method thereof, and a lithium-ion secondary battery, aiming to enable the lithium-ion secondary battery to simultaneously have higher safety performance, rate performance and cycle performance.

A first aspect of embodiments of the present application provides a positive electrode plate, including a positive electrode current collector and a positive electrode film disposed on at least one surface of the positive electrode current collector. The positive electrode film includes a positive active material which is a lithium manganese-based positive active material;

wherein the positive electrode plate satisfies formula (1)

$$\frac{\rho_{sum}}{\rho^{97.5-a}} \leq 3. \quad \text{formula (1)}$$

In the formula (1), $\rho_{sum}$ is the volume resistivity of the positive electrode plate, in kΩ·cm; ρ is the powder volume resistivity of the positive active material under a pressure of 20 MPa, in kΩ·cm; a is the mass percentage of the positive active material in the positive electrode film, in wt %.

A second aspect of an embodiment of the present application provides a lithium-ion secondary battery, including a positive electrode plate, a negative electrode plate, a separator and an electrolyte, wherein the positive electrode plate is the positive electrode plate according to the first aspect of the present application.

A third aspect of an embodiment of the present application provides a method for preparing a positive electrode plate, including the following steps: mixing a first lithium manganese-based positive active material, a conductive agent, a binder, and a solvent to obtain a pre-slurry; mixing a second lithium manganese-based positive active material with the pre-slurry to obtain a positive electrode slurry; coating the positive electrode slurry on at least one surface of the positive electrode current collector to form a positive electrode film, thereby obtaining a positive electrode plate;

wherein the positive electrode plate satisfies formula (1), $$\frac{\rho_{sum}}{\rho^{97.5-a}} \leq 3. \quad \text{formula (1)}$$

In the formula (1), $\rho_{sum}$ is the volume resistivity of the positive electrode plate, in kΩ·cm; ρ is the powder volume resistivity of the positive active material under a pressure of 20 MPa, in kΩ·cm; a is the mass percentage of the positive active material in the positive electrode film, in wt %.

The first lithium manganese-based positive active material is a compound represented by formula (3), and the second lithium manganese-based positive active material is a compound represented by formula (4),

$$\text{Li}_{1+x}\text{Mn}_a\text{Ni}_b\text{M}_{1-a-b}\text{O}_{2-y}\text{A}_y \quad \text{formula (3)}$$

$$\text{Li}_{1+z}\text{Mn}_e\text{N}_{2-e}\text{O}_{4-d}\text{B}_d \quad \text{formula (4)}$$

In the formula (3), $-0.1 \leq x \leq 0.2$, $0 < a < 1$, $0 \leq b < 1$, $0 < a+b < 1$, $0 \leq y < 0.2$, and M includes one or more of Co, Fe, Cr, Ti, Zn, V, Al, Zr and Ce, A includes one or more of S, N, F, Cl, Br and I, In the formula (4), $-0.1 \leq z \leq 0.2$, $0 < e \leq 2$, $0 \ d < 1$, and N includes one or more of Ni, Fe, Cr, Ti, Zn, V, Al, Mg, Zr and Ce, B includes one or more of S, N, F, Cl, Br and I.

Compared with the prior art, the present application has at least the following beneficial effects:

The positive electrode plate of the present application uses a lithium manganese-based positive active material as the positive active material, which has better structural stability, can withstand more severe structural destructive force, and reduces thermal runaway caused by material structural damage. In addition, the oxidation effect of the electrolyte on the surface of the positive active material is lower, thus the side reaction of the electrolyte on the surface of the positive active material can be reduced, suppressing gas generation and reducing heat generation. Therefore, the lithium-ion secondary battery has higher safety performance. At the same time, if the volume resistivity $\rho_{sum}$ of the positive electrode plate, the powder volume resistivity ρ of the positive active material under a pressure of 20 MPa, and the mass percentage of the positive active material in the positive electrode film satisfy the formula (1), the internal impedance of the battery can be effectively reduced and the polarization of the positive electrode is also reduced, so that the lithium-ion secondary battery has higher rate performance and cycle performance. Therefore, the use of the positive electrode plate of the present application can enable the lithium-ion secondary battery to have higher safety performance, rate performance and cycle performance at the same time.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

FIG. 1 is a schematic diagram of the internal particle distribution of Example 1(a) and Comparative Example 2(b) of this application.

DETAILED DESCRIPTION

In order to make the purpose, technical solutions, and beneficial technical effects of the present application clearer, the present application will be further described in detail below in conjunction with embodiments. It should be understood that the embodiments described in this specification are only for explaining the application, not intending for limiting the application.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Plate

The first aspect of embodiments of the present application provides a positive electrode plate, comprising a positive electrode current collector and a positive electrode film disposed on the positive electrode current collector. As a specific example, the positive electrode current collector comprises two opposing surfaces along its thickness direction, and the positive electrode film can be disposed on either of the two surfaces, or can be disposed on both surfaces.

In the positive electrode plate according to an embodiment of the present application, the positive electrode film contains a positive active material, which can carry out reversible deintercalation/intercalation of lithium ions and electron mobility during charge/discharge cycles. The positive current collector collects and outputs the generated current.

The positive active material is a lithium manganese-based positive active material. In addition, the positive electrode plate according to the present application satisfies the following formula (1):

$$\frac{\rho_{sum}}{\rho^{97.5-a}} \leq 3 \qquad \text{formula (1)}$$

In formula (1), $\rho_{sum}$ is the volume resistivity of the positive electrode plate, in kΩ·cm; $\rho$ is the powder volume resistivity of the positive active material under a pressure of 20 MPa, in kΩ·cm; a is the mass percentage of the positive active material in the positive electrode film, in wt %.

The positive electrode plate according to an embodiment of the present application uses a lithium manganese-based positive active material as the positive active material, which has better structural stability, can withstand more severe structural destructive force, and reduces thermal runaway caused by material structural damage. In addition, the oxidation effect of the electrolyte on the surface of the positive active material is lower, thus the side reaction of the electrolyte on the surface of the positive active material can be reduced, suppressing gas generation and reducing heat generation. Therefore, the lithium-ion secondary battery has higher safety performance. At the same time, if the volume resistivity $\rho_{sum}$ of the positive electrode plate, the powder volume resistivity $\rho$ of the positive active material under a pressure of 20 MPa, and the mass percentage of the positive active material in the positive electrode film satisfy the formula (1), the internal impedance of the battery can be effectively reduced and the polarization of the positive electrode is also reduced, so that the lithium-ion secondary battery has higher rate performance and cycle performance. Therefore, the use of the positive electrode plate of the present application can enable the lithium-ion secondary battery to have higher safety performance, rate performance and cycle performance at the same time.

Preferably, the positive electrode plate according to the present application satisfies the following formula (2)

$$10^{-10} \leq \frac{\rho_{sum}}{\rho^{97.5-a}} \leq 3 \qquad \text{formula (2)}$$

Preferably, the mass percentage ω of Mn in the positive active material and the powder volume resistivity ρ of the positive active material under a pressure of 20 MPa satisfy the following relationship: 3≤ω·ρ/100≤200.

The mass percentage ω of Mn in the positive active material and the powder volume resistivity ρ of the positive active material under a pressure of 20 MPa satisfy the above-mentioned relationship, so that the positive active material has higher intrinsic electronic conductivity. This can better improve the rate performance, high-temperature and low-temperature cycle performance and safety performance of the lithium-ion secondary battery, and it is beneficial to increasing the specific capacity and energy density of the lithium-ion secondary battery.

Preferably, the positive active material has a powder volume resistivity ρ under a pressure of 20 MPa between 0 to 450 kΩ·cm. Such positive active material has higher intrinsic electronic conductivity; and the surface of the positive active material has less lithium and other impurities, which reduces the interface resistance between the electrolyte and the positive active material, thereby greatly reducing the overall resistance of the battery, and increasing the rate performance and cycle performance of the battery. More preferably, the powder volume resistivity ρ of the positive active material under a pressure of 20 MPa is between 0 to 400 kΩ·cm.

The powder volume resistivity ρ of the positive active material under a pressure of 20 MPa can be measured by a known powder volume resistivity test method. As an example, the four-probe method is used to test the powder volume resistivity ρ of the positive active material under a pressure of 20 MPa. The test method includes: adding a positive active material powder to a sample table, applying a pressure of 20 MPa to the powder through a press; after the pressure is stabilized, reading the volume resistivity ρ of the positive active material under a pressure of 20 MPa through a resistivity meter.

Preferably, the positive active material is a secondary particle formed by aggregation of primary particles, wherein the secondary particle has an average particle diameter Dv50 preferably from 1 μm to 20 μm, and the secondary particle has a BET specific surface area preferably from 0.3 m²/g to 1.5 m²/g.

If the average particle size of the positive active material is too small or the BET specific surface area of the positive active material is too high, the contact area between the positive active material and the electrolyte is too large. In this way, under the effect of high voltage or strong oxidation, the electrolyte is prone to cause side reactions on the surface of the positive active material, worsening the problem of gas production, and increasing the heat production of the battery, which deteriorates the safety performance and cycle performance of the battery. If the average particle size of the positive active material is too large or the BET specific surface area of the positive active material is too low, the path for deintercalation/intercalation of lithium ions in the positive active material particles during charging and discharging is too long, and the dynamic performance of the battery is affected. The positive electrode plate according to an embodiment of the present application may use a positive active material with an average particle diameter Dv50 of 1 μm~20 μm and a BET specific surface area of 0.3 m²/g~1.5 m²/g, which is beneficial to improving the rate performance, safety performance and cycle performance of lithium-ion secondary batteries.

In some embodiments, the positive active material comprises one or more of a first lithium manganese-based positive active material and a second lithium manganese-based positive active material.

The first lithium manganese-based positive active material is a compound represented by formula (3):

formula (3)

In the formula (3), $-0.1 \leq x \leq 0.2$, $0<a<1$, $0 \leq b<1$, $0<a+b<1$, $0 \leq y<0.2$, M comprises one or more of Co, Fe, Cr, Ti, Zn, V, Al, Zr, and Ce, and A comprises one or more of S, N, F, Cl, Br, and I.

More preferably, in the formula (3), $0.5 \leq b \leq 1$.

The second lithium manganese-based positive active material is a compound represented by formula (4):

formula (4)

In the formula (4), $-0.1 \leq z \leq 0.2$, $0<e \leq 2$, $0 \leq d<1$, N comprises one or more of Ni, Fe, Cr, Ti, Zn, V, Al, Mg, Zr and Ce, and B comprises one or more of S, N, F, Cl, Br and I.

In the positive electrode plate according to an embodiment of the present application, when the lithium manganese-based positive active material comprises the first lithium manganese-based positive active material and the second lithium manganese-based positive active material, synergistic effect between the first lithium manganese-based positive active material and the second lithium manganese-based positive active material can be fully utilized. Such synergistic effect can ensure that the lithium-ion secondary battery has a higher specific capacity and energy density, and can also significantly improve the rate performance, cycle performance and safety performance of the lithium-ion secondary battery.

The positive electrode plate according to embodiments of the present application preferably may have a volume resistivity $\rho_{sum}$ preferably ≤450 kΩ·cm. The use of such positive electrode plate is beneficial to reducing the internal DC impedance of the battery and improve the cycle performance and rate performance of the lithium-ion secondary battery. Further preferably, the volume resistivity of the positive electrode plate is ρsum≤300 kΩ·cm. More preferably, the volume resistivity of the positive electrode plate is ρsum≤160 kΩ·cm.

The positive electrode plate has a packing density preferably from 3.1 g/cm³ to 3.65 g/cm³. The above packing density of the positive electrode plate is appropriate, so that the particles inside the positive electrode film are in full contact, and the contact resistance is reduced, thereby helping to improve the rate performance and cycle performance of the lithium-ion secondary battery.

In the positive electrode plate according to an embodiment of the present application, the positive active material is present in a mass percentage preferably from 80 wt % to 96.5 wt % in the positive electrode film, more preferably from 90 wt % to 96.5 wt %. This enables the lithium-ion secondary battery to have a desired specific capacity and energy density.

The positive electrode film may further comprises a conductive agent to increase the conductivity between the positive active material and the positive electrode current collector and the conductivity between the particles of the positive active material, and increase the utilization rate of the positive active material.

The mass percentage of the conductive agent in the positive electrode film is preferably from 1 wt % to 10 wt %. More preferably, the weight ratio of the conductive agent to the positive active material in the positive electrode film is greater than or equal to 1.5:95.5. This is conducive to obtaining a low electrode plate resistance.

The present application has no particular limitation on the conductive agent, and it may be a conductive agent known in the art. As an example, the conductive agent may be one or more of graphite, superconducting carbon, acetylene black, carbon black, Ketjen black, carbon dots, carbon nanotubes, graphene, and carbon nanofibers, preferably one or more of conductive carbon black, carbon nanotubes and carbon nanofibers.

In some optional embodiments, the positive electrode film may further comprise a binder.

There is no specific limit to the binder, and it may be a binder known in the art. The binder may be one or more of styrene butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA) and polyvinyl alcohol (PVA).

The binder is used for bonding the particles of positive active material and the conductive agent to ensure that the internal conductive network of the electrode plate has good structural stability. Due to the poor conductivity of the binder itself, it is disadvantageous to use the binder in an excessive high amount. Preferably, the mass percentage content of the binder in the positive active material layer is less than or equal to 2 wt %, which is conducive to obtaining a low electrode plate resistance.

The positive electrode current collector can be a metal foil or a porous metal plate, for example, a foil or a porous plate of metals such as aluminum, copper, nickel, titanium, or silver, or their alloys, such as aluminum foil.

The embodiment of the present application also provides a method for preparing a positive electrode plate.

The positive electrode plate according to an embodiment of the present application can be prepared by a coating method. For example, the positive electrode slurry is first coated on at least one surface of the positive electrode current collector to obtain a positive active material coating; then the positive active material coating is dried and cold pressed to form a positive electrode film on the positive electrode current collector to obtain the positive electrode plate.

As a specific example, the preparation method of the positive electrode plate includes the following steps:

S100: Mixing a positive active material, a binder, a conductive agent and a solvent according to a predetermined ratio and stirring the mixture to a homogeneous system to obtain a positive electrode slurry, wherein the solvent may be N-methylpyrrolidone (NMP).

The positive active material is a lithium manganese-based positive active material. The lithium manganese-based positive active material may comprise one or more of the aforementioned first lithium manganese-based positive active material and the second lithium manganese-based positive active material. When the positive active material comprises the first lithium manganese-based positive active material and the second lithium manganese-based positive active material, the first lithium manganese-based positive active material and the second lithium manganese-based positive active material can be added at the same time, of course, they can also be added in a sequential order. The first lithium manganese-based positive active material and the second lithium manganese-based positive active material are each independently added at one time, and of course, they can also be added independently in batches.

In some preferred embodiments, the first lithium manganese-based positive active material, the binder, the conductive agent, and the organic solvent are first stirred and mixed to form a pre-slurry; then the second lithium-manganese-based active material is added to the pre-slurry, stirred and mixed to prepare a positive electrode slurry. The method can uniformly distribute the particles inside the positive electrode film, avoid the agglomeration of the conductive agent, thereby forming a uniformly distributed conductive network, and therefore greatly reducing the electrode plate resistance, and improving the rate performance and cycle performance of the battery.

The above-mentioned solvent is preferably an organic solvent, such as N-methylpyrrolidone (NMP).

S200: Coating the positive electrode slurry on the positive electrode current collector to form a positive active material coating to obtain a preliminary product of positive electrode plate.

S300: Subjecting the initial positive electrode plate to drying, cold-pressing and other processes to obtain a positive electrode plate.

The positive electrode plate according the embodiments of the present application can be realized by the above preparation method.

Lithium-Ion Secondary Battery

A second aspect according to the embodiments of the present application provides a lithium-ion secondary battery, comprising a positive electrode plate, a negative electrode plate, a separator, and an electrolyte.

The positive electrode plate adopts the positive electrode plate provided in the first aspect according to the embodiments of the present application.

The negative electrode plate may be a metallic lithium sheet, or may comprise a negative electrode current collector and a negative electrode film disposed on at least one surface of the negative electrode current collector.

The negative electrode film usually contains a negative active material and optionally a conductive agent, a binder, and a thickener. As an example, the negative active material may be one or more of natural graphite, artificial graphite, mesophase micro carbon sphere (MCMB), hard carbon, soft carbon, silicon, silicon-carbon composite, SiO, Li—Sn alloy, Li—Sn—O alloy, Sn, SnO, $SnO_2$, spinel-type lithium titanate $Li_4Ti_5O_{12}$, Li—Al alloy and lithium metal; the conductive agent may be one or more of graphite, superconducting carbon, acetylene black, carbon black, ketjen black, carbon dots, carbon nanotubes, graphene, and carbon nanofibers; the binder may be one or more of styrene-butadiene rubber (SBR), polyvinylidene fluoride (PVDF), polytetrafluoroethylene (PTFE), water-based acrylic resin and carboxymethyl cellulose (CMC); the thickener may be carboxymethyl cellulose (CMC). However, the present application is not limited to these materials, and other materials that may be used as negative active material, conductive agent, binder, and thickeners for a lithium-ion secondary battery can also be used in the present application.

Furthermore, the negative electrode film may optionally comprise other additives, such as PTC thermistor materials.

The negative electrode current collector can be made of a metal foil or a porous metal sheet, for example, a foil or a porous sheet made of a metal such as copper, nickel, titanium, or iron, or an alloy thereof, such as copper foil.

The negative electrode plate can be prepared according to a conventional method in the art. The negative active material and optional conductive agent, binder and thickener are usually dispersed in a solvent to form a homogeneous negative electrode slurry, wherein the solvent can be N-methylpyrrolidone (NMP) or deionized water. The negative electrode slurry is coated on the negative electrode current collector, and after drying, cold pressing and other processes, a negative electrode plate is obtained.

The separator is not particularly limited, and any well-known porous structure separator having electrochemical stability and chemical stability can be selected. For example, the separator may be a single-layer or multilayer film selected from one or more of glass fiber, non-woven fabric, polyethylene, polypropylene, and polyvinylidene fluoride.

In the lithium-ion secondary battery of the present application, the electrolyte comprises an organic solvent and a lithium salt.

The present application does not specifically limit the types of the organic solvent. As an example, the organic solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE), preferably two or more thereof.

There is no specific limit to the lithium salt. As an example, the lithium salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate). The concentration of the lithium salt in the electrolyte can be from 0.5 mol/L to 1.5 mol/L, such as from 0.8 mol/L to 1.2 mol/L.

The electrolyte may optionally comprise an additive. As an example, the additive may be selected from one or more of vinylene carbonate (VC), vinyl ethylene carbonate (VEC), fluoroethylene carbonate (FEC), succinonitrile (SN), adiponitrile (ADN), 1,3-propene sultone (PST), sulfonate cyclic quaternary ammonium salt, tris(trimethylsilyl) phosphate (TMSP), and tris (trimethylsilyl) borate (TMSB).

The above electrolyte may be prepared in accordance with a conventional method in the art. An electrolyte may be obtained by mixing an organic solvent, a lithium salt and optionally an additive until homogeneous. Here, the sequence in which the materials are added is not particularly limited. For example, an electrolyte may be obtained by adding a lithium salt and optionally additives into an organic solvent and mixing homogeneously. Or the lithium salt may be added into the solvent first, and then the optional additives may be added into the solvent separately or simultaneously.

A positive electrode plate, a separator and a negative electrode plate are stacked in order, so that the separator is located between the positive electrode plate and the negative electrode plate to play a role of isolation, as such to obtain a battery core, or to obtain a battery core after winding. The battery is placed in a packaging case, then the electrolyte is injected and sealed to obtain a lithium-ion secondary battery.

The use of the positive electrode plate according to the first aspect of embodiments of the present application can enable the lithium-ion secondary battery of the present application to have higher safety performance, rate performance and cycle performance at the same time.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment, and the instruments used in the examples are commercially available.

Example 1

Preparation of Positive Electrode Plate $LiNi_{0.8}Co_{0.1}Mn_{0.1}O_2$ as a first lithium manganese-based positive active material, PVDF as a binder, conductive carbon black and NMP as a solvent were mixed and stirred to obtain a stable pre-slurry; then $LiMn_2O_4$ as a second lithium manganese-based positive active material is added to the pre-slurry, mixed and stirred to prepare a positive electrode slurry. The positive electrode slurry was uniformly coated on an aluminum foil as positive electrode current collector, dried and rolled to obtain a positive electrode plate. The weight ratio of the first lithium manganese-based positive active material ($LiNi_{0.8}Co_{0.1}Mn_{0.1}O$), the second lithium manganese-based positive active material ($LiMn_2O_4$), the conductive carbon black and the binder (PVDF) was 76:20.5:1.5:2.

As shown in FIG. 1a, the particles in the positive electrode film of this example were uniformly distributed and formed a uniformly distributed conductive network.

Preparation of Negative Electrode Plate

Graphite as negative active material, conductive carbon black, SBR as a binder and CMC as a thickener were added into deionized water as a solvent at a weight ratio of 96:1:2:1 and mixed thoroughly to form a uniform negative electrode slurry. Then the slurry was uniformly coated on a copper foil as a negative electrode current collector, and after drying and rolling, a negative electrode plate was obtained.

Preparation of Electrolyte

Ethylene carbonate (EC), ethyl methyl carbonate (EMC) and diethyl carbonate (DEC) were mixed uniformly in a volume ratio of 1:1:1 to obtain an organic solvent. Fully dried $LiPF_6$ was dissolved in the above-mentioned organic solvent to obtain an electrolyte, wherein the concentration of $LiPF_6$ was 1 mol/L.

Preparation of Lithium-Ion Secondary Battery

The positive electrode plate, the separator, and the negative electrode plate were stacked in order. A PP/PE/PP composite film was used as a separator for taking an isolating action between the positive electrode plate and the negative electrode plate and then was wound into a battery core and installed into a soft case. Having been top-side sealed, injected with an electrolyte, etc. a lithium-ion secondary battery was obtained.

Examples 2-10

Examples 2-10 were prepared in the same procedure as Example 1 except that the relevant parameters of the positive electrode plate were adjusted, as shown in Table 1

Example 11

Example 11 was prepared in the same procedure as Example 1 except that in the preparation step of the positive electrode plate, except that in the preparation step of the positive electrode plate, $LiNi_{0.8}Co_{0.1}Mn_{0.1}O_2$ as a lithium manganese-based positive active material, conductive carbon black, PVDF as a binder and NMP as a solvent were mixed and stirred to prepare a positive electrode slurry.

Example 12

Different from Example 1, in the preparation step of the positive electrode plate, $LiMn_2O_4$ as a lithium manganese-based positive active material, conductive carbon black, PVDF as a binder and NMP as a solvent were mixed and stirred to prepare a positive electrode slurry.

Comparative Example 1

Different from Example 1, the relevant parameters of the positive electrode plate were adjusted, as shown in Table 1.

Comparative Example 2

Different from Example 1, $LiNi_{0.8}Co_{0.1}Mn_{0.1}O_2$ as a first lithium manganese-based positive active material, $LiMn_2O_4$ as a second lithium manganese-based positive active material, conductive carbon black, PVDF as a binder and NMP as a solvent were mixed and stirred to obtain a positive electrode slurry.

As shown in FIG. 1b, the distribution of the particles inside the positive electrode film of Comparative Example 2 was uneven, the conductive agent aggregated badly, and the conductive network was quite heterogeneous.

Comparative Example 3

Different from Example 11, the relevant parameters of the positive electrode plate were adjusted, as shown in Table 1.

Comparative Example 4

Different from Example 12, the relevant parameters of the positive electrode plate were adjusted, as shown in Table 1.

Test Section (1) Test for Powder Volume Resistivity $\rho$ of Positive Active Material Under a Pressure of 20 MPa A four-probe method was used to test the powder volume resistivity of the positive active material under a pressure of 20 MPa: adding a positive active material powder to a sample table, and applying a pressure of 20 MPa to the powder through a press; after the pressure was stable, the powder volume resistivity $\rho$ of the positive active material under a pressure of 20 MPa can be read from a resistivity tester.

(2) Test for Volume Resistivity $\rho_{sum}$ of Positive Electrode Plate

A HIOKI BT3562 internal resistance tester was used to test the resistance of the positive electrode plate, including: cutting the positive electrode plate into a 10 cm×10 cm electrode plate sample, clamping the electrode plate sample between two conductive terminals of the internal resistance tester and applying a predetermined pressure, then measuring the resistance R of the electrode plate sample, wherein the diameter of the conductive terminal was 14 mm, the applied pressure was from 15 MPa to 27 MPa, and the sampling time was in the range of 5 s to 17 s.

Then the volume resistivity $\rho_{sum}$ of the positive electrode plate was calculated according to the following equation: $\rho_{sum}=R\cdot\alpha/l$, where $\alpha$ was the detection area, which was equal to the area of the conductive terminal in this test; l was the thickness of the electrode plate sample, i.e., the thickness of the positive electrode plate.

(3) High-Temperature Cycle Performance Test of Lithium-Ion Secondary Batteries

At 45° C., the fresh lithium-ion secondary batteries were left for 5 minutes, charged at a constant current of 1 C to 4.2V, and then charged at a constant voltage until the current was less than or equal to 0.05 C. After that, the charged batteries were left for 5 minutes and then discharged at a constant current of 1 C to 3.0V. This was a charge and discharge cycle. The resulting discharge capacity was recorded as the discharge capacity after the first cycle. These lithium-ion secondary batteries were subjected to a 500-cycle charge-discharge test following the procedure described above, and the discharge capacity for each cycle was recorded.

Capacity retention (%) of lithium-ion secondary battery after 500 cycles of 1 C/1 C at 45° C.=the discharge capacity after the 500th cycle/the discharge capacity after the first cycle×100%.

(4) Rate Performance Test of Lithium-Ion Secondary Batteries

At 25° C., the fresh lithium-ion secondary batteries were left for 5 minutes, charged at a constant current of 1 C to a voltage of 4.2V, then charged at a constant voltage to a current of 0.05 C or less, and then were allowed to stand for 5 minutes, and then discharged again to 3.0V at a constant current of 1 C. Thus, the 1 C rate discharge capacity of the lithium-ion secondary battery was measured.

At 25° C., the fresh lithium-ion secondary batteries were left for 5 minutes, charged at a constant current of 1 C to a voltage of 4.2V and then charge at a constant voltage to a current of 0.05 C or less, and then were allowed to stand for 5 minutes, followed by discharging again to 3.0V at a constant current of 5 C. Thus, the 5 C rate discharge capacity of the lithium-ion secondary battery was measured.

Lithium-ion secondary battery 5 C rate discharge capacity retention (%)=5 C rate discharge capacity/1 C rate discharge capacity×100%.

(5) Safety Performance Test of Lithium-Ion Secondary Batteries

At 25° C., the fresh lithium-ion secondary batteries were left for 5 minutes, charged at a constant current of 1 C to 4.2V, and then charged at a constant voltage until the current was less than or equal to 0.05 C.

At 25° C., the fresh lithium ion secondary batteries were fixed on the needle puncture plate, and a 5 mm diameter needle was taken to penetrate the lithium-ion secondary batteries at a speed of 3 mm/s. During needle penetration, the surface temperatures of the batteries were monitored and the maximum surface temperature rise was recorded.

The test results of Examples 1 to 12 and Comparative Examples 1 to 4 were shown in Table 2.

TABLE 1

| | Positive active material | Wr | $\rho_{sum}$ k$\Omega \cdot$ cm | $\rho$ k$\Omega \cdot$ cm |
|---|---|---|---|---|
| Example 1 | $LiNi_{0.8}Co_{0.1}Mn_{0.1}O_2/LiMn_2O_4$ | 76:20.5:1.5:2 | 154.8 | 90.1 |
| Example 2 | $LiNi_{0.8}Co_{0.1}Mn_{0.1}O_2/LiMn_2O_4$ | 46.5:50:1.5:2 | 298.6 | 280.3 |
| Example 3 | $LiNi_{0.8}Co_{0.1}Mn_{0.1}O_2/LiMn_2O_4$ | 36.5:60:1.5:2 | 409.5 | 398.7 |
| Example 4 | $LiNi_{0.8}Co_{0.1}Mn_{0.1}O_2/LiMn_2O_4$ | 29:67.5:1.5:2 | 475.8 | 467.9 |
| Example 5 | $LiNi_{0.8}Co_{0.1}Mn_{0.1}O_2/LiMn_2O_4$ | 29:67:2:2 | 447.9 | 441.2 |
| Example 6 | $LiNi_{0.8}Co_{0.1}Mn_{0.1}O_2/LiMn_2O_4$ | 94.5:2:1.5:2 | 159.3 | 58.0 |
| Example 7 | $LiNi_{0.6}Co_{0.2}Mn_{0.2}O_2/LiMn_2O_4$ | 76:20.5:1.5:2 | 135.6 | 67.3 |
| Example 8 | $LiNi_{0.5}Co_{0.2}Mn_{0.3}O_2/LiMn_2O_4$ | 76:20.5:1.5:2 | 142.1 | 71.2 |
| Example 9 | $LiNi_{1/3}Co_{1/3}Mn_{1/3}O_2/LiMn_2O_4$ | 76:20.5:1.5:2 | 139.8 | 69.8 |
| Example 10 | $LiNi_{0.8}Co_{0.1}Mn_{0.1}O_2/LiMn_2O_4$ | 16:80:2:2 | 380.0 | 512.3 |
| Example 11 | $LiNi_{0.8}Co_{0.1}Mn_{0.1}O_2$ | 96.5:1.5:2 | 143.3 | 53.4 |
| Example 12 | $LiMn_2O_4$ | 96.5:1.5:2 | 492.3 | 475.2 |
| Comparative Example 1 | $LiNi_{0.8}Co_{0.1}Mn_{0.1}O_2/LiMn_2O_4$ | 76:21:1:2 | 433.0 | 91.2 |
| Comparative Example 2 | $LiNi_{0.8}Co_{0.1}Mn_{0.1}O_2/LiMn_2O_4$ | 76:20.5:1.5:2 | 587.1 | 88.5 |

TABLE 1-continued

| | Positive active material | Wr | $\rho_{sum}$ kΩ·cm | ρ kΩ·cm |
|---|---|---|---|---|
| Comparative Example 3 | $LiNi_{0.8}Co_{0.1}Mn_{0.1}O_2$ | 97.2:0.8:2 | 284.3 | 53.4 |
| Comparative Example 4 | $LiMn_2O_4$ | 97.2:0.8:2 | 593.6 | 475.2 |

TABLE 2

| | $\frac{\rho_{sum}}{\rho^{97.5-a}} \leq 3$ | ω·p/100 | 5C rate discharge capacity retention/% | Capacity retention (%) after 500 cycles of 1C/1C at 45° C. | Maximum temperature rise during needle penetration/° C. |
|---|---|---|---|---|---|
| Example 1 | 1.718 | 15.64 | 77.4 | 91.1 | 213.0 |
| Example 2 | 1.065 | 95.89 | 76.8 | 90.9 | 201.7 |
| Example 3 | 1.027 | 159.16 | 76.2 | 89.0 | 198.5 |
| Example 4 | 1.017 | 206.81 | 72.8 | 85.7 | 184.5 |
| Example 5 | 0.048 | 194.66 | 75.3 | 88.8 | 180.3 |
| Example 6 | 2.747 | 3.94 | 78.1 | 91.2 | 250.1 |
| Example 7 | 2.015 | 14.70 | 78.5 | 90.8 | 208.0 |
| Example 8 | 1.996 | 18.76 | 77.9 | 91.6 | 211.6 |
| Example 9 | 2.003 | 19.45 | 77.5 | 91.3 | 208.7 |
| Example 10 | 0.033 | 264.24 | 63.7 | 83.9 | 121.3 |
| Example 11 | 2.684 | 3.02 | 78.6 | 90.7 | 359.2 |
| Example 12 | 1.036 | 288.78 | 59.8 | 80.3 | 108.7 |
| Comparative Example 1 | 45.341 | 16.03 | 62.4 | 82.1 | 208.5 |
| Comparative Example 2 | 6.634 | 15.36 | 54.3 | 81.9 | 217.6 |
| Comparative Example 3 | 86.201 | 3.02 | 59.3 | 79.4 | 387.2 |
| Comparative Example 4 | 93.418 | 288.78 | 50.1 | 77.3 | 201.3 |

As can be seen from the comparison between Examples 1-10 with Comparative Examples 1-2, the comparison between Example 11 with Comparative Example 3, and the comparison between Example 12 with Comparative Example 4, capacity retention after 500 cycles of 1 C/1 C at 45° C. and 5 C rate discharge capacity of the lithium-ion secondary batteries of Examples 1-12 were improved. It can be seen that by making the volume resistivity $\rho_{sum}$ of the positive electrode plate, the powder volume resistivity ρ of the positive active material under a pressure of 20 MPa, and the mass percentage a of the positive active material in the positive electrode film satisfy the formula (1), the rate performance and cycle performance of the lithium-ion secondary batteries were improved.

Compared with Example 11, the maximum surface temperature rise of the lithium-ion secondary batteries of Examples 1-10 and 12 was significantly reduced throughout the process of needle penetration. It could be seen that when the mass percentage ω of Mn in the positive active material was greater than or equal to 6 wt %, the safety performance of the lithium-ion secondary battery was improved. Compared with Examples 10 and 12, the lithium-ion secondary batteries of Examples 1-9 and 11 had improved capacity retention after 500 cycles of 1 C/1 C at 45° C. and 5 C rate discharge capacity. It could be seen that when the mass percentage ω of Mn in the positive active material was less than or equal to 45% by weight, the rate performance and cycle performance of the lithium-ion secondary battery were improved.

Compared with Examples 4, 10, and 12, both the capacity retention after 500 cycles of 1 C/1 C at 45° C. and 5 C rate discharge capacity of the lithium-ion secondary batteries of Examples 1-3, 5 to 9, and 11 were improved. It could be seen that when the mass percentage ω of Mn in the positive active material and the powder volume resistivity ρ of the positive active material under a pressure of 20 MPa satisfied the following relationship: 3≤ω·ρ/100≤200, the rate performance and cycle performance of the lithium-ion secondary battery had been improved.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A positive electrode plate, including a positive electrode current collector and a positive electrode film disposed on at least one surface of the positive electrode current collector, wherein the positive electrode film includes a positive active material which is a lithium manganese-based positive active material, wherein the positive electrode plate satisfies formula (1), $$\frac{\rho_{sum}}{\rho^{97.5-a}} \leq 3 \qquad \text{formula (1)}$$

in which $p_{sum}$ is volume resistivity of the positive electrode plate, in kΩ·cm; ρ is powder volume resistivity of the positive active material under a pressure of 20 MPa, in kΩ·cm; a is mass percentage of the positive active material in the positive electrode film, in wt %.

2. The positive electrode plate according to claim 1, wherein the positive electrode plate satisfies formula (2), $$10^{-10} \leq \frac{\rho_{sum}}{\rho^{97.5-a}} \leq 3. \qquad \text{formula (2)}$$

3. The positive electrode plate according to claim 1, wherein positive electrode plate has a volume resistivity $\rho_{sum} \leq 450$ kΩ·cm.

4. The positive electrode plate according to claim 1, wherein positive electrode plate has a volume resistivity $\rho_{sum} \leq 300$ kΩ·cm.

5. The positive electrode plate according to claim 1, wherein positive electrode plate has a volume resistivity $\rho_{sum} < 160$ kΩ·cm.

6. The positive electrode plate according to claim 1, wherein the positive active material has a powder volume resistivity ρ under a pressure of 20 MPa between 0 to 450 kΩ·cm.

7. The positive electrode plate according to claim 1, wherein the positive active material has a powder volume resistivity ρ under a pressure of 20 MPa between 0 to 400 kΩ·cm.

8. The positive electrode plate according to claim 1, wherein the positive active material is present in a mass percentage from 80 wt % to 96.5 wt % in the positive electrode film.

9. The positive electrode plate according to claim 1, wherein the lithium manganese-based positive active material includes a first lithium manganese-based positive active material according to formula (3) and a second lithium manganese-based positive active material according to formula (4), Li$_{1+x}$Mn$_a$Ni$_b$M$_{1-a-b}$O$_{2-y}$A$_y$      formula (3)

Li$_{1+z}$Mn$_e$N$_{2-e}$O$_{4-d}$B$_d$      formula (4)

where in the formula (3), −0.1 ≤ x ≤ 0.2, 0<a<1, 0 ≤ b<1, 0<a+b<1, 0 ≤ y<0.2, and M includes one or more of Co, Fe, Cr, Ti, Zn, V, Al, Zr and Ce, A includes one or more of S, N, F, Cl, Br and I; and in the formula (4), −0.1 ≤ z ≤ 0.2, 0<e ≤ 2, 0 ≤ d<1, and N includes one or more of Ni, Fe, Cr, Ti, Zn, V, Al, Mg, Zr and Ce, B includes one or more of S, N, F, Cl, Br and I.

10. The positive electrode plate according to claim 1, wherein the mass percentage ω of Mn in the positive active material and the powder volume resistivity ρ of the positive active material under a pressure of 20 MPa satisfy the following relationship: 3 ≤ ω·ρ/100 ≤ 200.

11. The positive electrode plate according to claim 1, wherein the positive active material has an average particle diameter Dv50 from 1 μm to 20 μm, and the positive active material has a BET specific surface area from 0.3 m²/g to 1.5 m²/g.

12. The positive electrode plate according to claim 1, wherein the positive electrode plate has a packing density from 3.1 g/cm³ to 3.65 g/cm³.

13. A lithium-ion secondary battery including a positive electrode plate, a negative electrode plate, a separator and an electrolyte, wherein the positive electrode plate is the positive electrode plate according to claim 1.

14. A method for preparing a positive electrode plate, comprising:
mixing a first lithium manganese-based positive active material, a conductive agent, a binder, and a solvent to obtain a pre-slurry;
mixing a second lithium manganese-based positive active material with the pre-slurry to obtain a positive electrode slurry;
coating the positive electrode slurry on at least one surface of a positive electrode current collector to form a positive electrode film, thereby obtaining a positive electrode plate, wherein the positive electrode plate satisfies formula (1), $$\frac{\rho_{sum}}{\rho^{97.5-a}} \leq 3 \qquad \text{formula (1)}$$

in which $\rho_{sum}$ is volume resistivity of the positive electrode plate, in kΩ·cm; ρ is powder volume resistivity of the positive active material under a pressure of 20 MPa, in kΩ·cm; a is mass percentage of the positive active material in the positive electrode film, in wt %; and wherein the first lithium manganese-based positive active material is a compound represented by formula (3), and the second lithium manganese-based positive active material is a compound represented by formula (4), Li$_{1+x}$Mn$_a$Ni$_b$M$_{1-a-b}$O$_{2-y}$A$_y$      formula (3)

Li$_{1+z}$Mn$_e$N$_{2-e}$O$_{4-d}$B$_d$      formula (4)

where in the formula (3), −0.1 ≤ x ≤ 0.2, 0<a<1, 0 ≤ b<1, 0<a+b<1, 0 ≤ y<0.2, and M includes one or more of Co, Fe, Cr, Ti, Zn, V, Al, Zr and Ce, A includes one or more of S, N, F, Cl, Br and I; and in the formula (4), −0.1 ≤ z ≤ 0.2, 0<e ≤ 2, 0 ≤ d<1, and N includes one or more of Ni, Fe, Cr, Ti, Zn, V, Al, Mg, Zr and Ce, B includes one or more of S, N, F, Cl, Br and I.

\* \* \* \* \*